(12) United States Patent
Sun

(10) Patent No.: US 12,538,096 B2
(45) Date of Patent: Jan. 27, 2026

(54) INFORMATION INTERACTION METHOD, SERVER, NON-OBU ONBOARD TERMINAL, AND STORAGE MEDIUM

(71) Applicant: ZTE Corporation, Shenzhen (CN)

(72) Inventor: Xujiang Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 377 days.

(21) Appl. No.: 17/928,633

(22) PCT Filed: May 8, 2021

(86) PCT No.: PCT/CN2021/092475
§ 371 (c)(1),
(2) Date: Nov. 30, 2022

(87) PCT Pub. No.: WO2021/249079
PCT Pub. Date: Dec. 16, 2021

(65) Prior Publication Data
US 2023/0316922 A1  Oct. 5, 2023

(30) Foreign Application Priority Data
Jun. 11, 2020  (CN) .......................... 202010529820.5

(51) Int. Cl.
*H04W 4/029* (2018.01)
*G08G 1/16* (2006.01)

(52) U.S. Cl.
CPC ............ *H04W 4/029* (2018.02); *G08G 1/164* (2013.01); *G08G 1/166* (2013.01)

(58) Field of Classification Search
CPC ........ H04W 4/029; G08G 1/164; G08G 1/166
See application file for complete search history.

(56) References Cited

U.S. PATENT DOCUMENTS

| 6,121,896 A | * | 9/2000 | Rahman | G08G 1/162 |
| | | | | 340/463 |
| 7,908,921 B2 | * | 3/2011 | Binda | G01C 5/06 |
| | | | | 73/384 |

(Continued)

FOREIGN PATENT DOCUMENTS

| CN | 105513425 A | 4/2016 |
| CN | 106097775 A | 11/2016 |

(Continued)

OTHER PUBLICATIONS

European Search Report for corresponding application EP21820881; Mail date Oct. 4, 2023.

(Continued)

*Primary Examiner* — Ramsey Refai
(74) *Attorney, Agent, or Firm* — CANTOR COLBURN LLP

(57) ABSTRACT

An information interaction method, a server, a non-OBU onboard terminal, and a storage medium. The information interaction method comprises: a server acquires at least two pieces of vehicle information, wherein at least one piece of vehicle information comes from a non-OBU onboard terminal (S100); the server generates vehicle early-warning information according to the at least two pieces of vehicle information (S200); and the server sends the vehicle early-warning information to the non-OBU onboard terminal, so that the non-OBU onboard terminal pushes early-warning notification information according to the vehicle early-warning information (S300).

13 Claims, 5 Drawing Sheets

(56) References Cited

U.S. PATENT DOCUMENTS

| | | | |
|---|---|---|---|
| 9,734,715 B2* | 8/2017 | Cazanas | B60W 30/09 |
| 9,767,625 B1* | 9/2017 | Snyder | G07C 5/008 |
| 2013/0082874 A1* | 4/2013 | Zhang | G01S 19/48 |
| | | | 340/936 |
| 2016/0165034 A1 | 6/2016 | Nixon | |
| 2017/0270787 A1 | 9/2017 | Menard | |
| 2018/0068562 A1 | 3/2018 | Ho et al. | |
| 2019/0202476 A1 | 7/2019 | Tao et al. | |

FOREIGN PATENT DOCUMENTS

| | | |
|---|---|---|
| CN | 107295055 A | 10/2017 |
| CN | 107749193 A | 3/2018 |
| CN | 110660221 A | 1/2020 |
| CN | 110910644 A | 3/2020 |
| JP | 2004086699 A | 3/2004 |
| JP | 2018041382 A | 3/2018 |
| JP | 2018101384 A | 6/2018 |
| JP | 2019145074 A | 8/2019 |
| WO | 2008053912 A1 | 5/2008 |
| WO | 2020071072 A1 | 4/2020 |

OTHER PUBLICATIONS

International Search Report for corresponding application PCT/CN2021/092475 filed May 8, 2021; Report dated Jul. 28, 2021.
Chinese Office Action for corresponding application 202010529820.5; Mail date May 30, 2025; 14 pages.
Japanese Office Action for corresponding application 2022576458; Mail date Apr. 14, 2025; 9 pages.
Japanese Office Action; Application No. 2022576458; date of mailing: Oct. 28, 2025; 8 pages.

* cited by examiner

| Vehicle ID | GNSS information | Vehicle body length | Vehicle body width |
|---|---|---|---|
| | | | |

Fig. 3

| Longitude | Latitude | Elevation | Vehicle speed | Heading angle | GPS time |
|---|---|---|---|---|---|
| | | | | | |

Fig. 4

| Early-warning type | First vehicle ID | First vehicle GNSS information | Second vehicle ID | Second vehicle GNSS information | Collision prediction time |
|---|---|---|---|---|---|
| | | | | | |

Fig. 5

The vehicle early-warning information is sent to a non-OBU onboard terminal within a preset distance range from the positioning information about the predicted collision vehicle — S400

Fig. 6

The vehicle early-warning information is sent to an OBU device over a wireless network — S500

Fig. 7

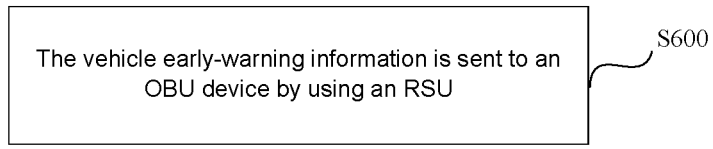
Fig. 8
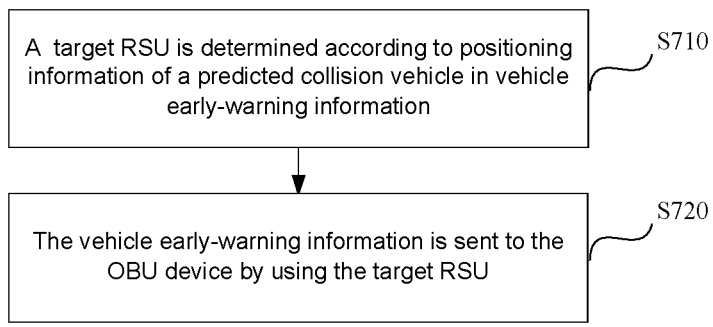
Fig. 9
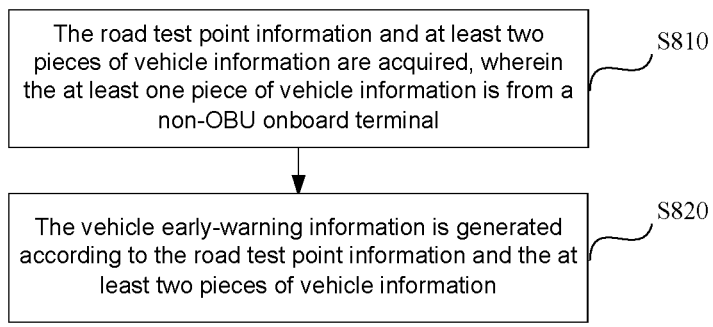
Fig. 10
| RsuId | Longitude | Latitude | GPS time |
Fig. 11

INFORMATION INTERACTION METHOD, SERVER, NON-OBU ONBOARD TERMINAL, AND STORAGE MEDIUM

CROSS-REFERENCE TO RELATED APPLICATION

The present disclosure is proposed on the basis of Chinese patent application No. 202010529820.5 and filed on 11 Jun. 2020, and claims priority to the Chinese patent application, the disclosure of which is hereby incorporated into the present disclosure for reference in its entirety.

TECHNICAL FIELD

The embodiments of the present disclosure relate to, but are not limited to, the field of information processing technologies, and in particular, to an information interaction method, a server, a non-OBU onboard terminal, and a computer readable storage medium.

BACKGROUND

The vehicle to vehicle (V2V) communication technology is an important vehicle networking technology. V2V refers to performing communications between vehicles, for example, collision early-warning or blind area early-warning, so as to achieve the objectives of reducing traffic accidents and improving traffic efficiency. In order to achieve V2V communication, an onboard unit (OBU) device needs to be installed to a vehicle, and the OBU device supports cellular vehicle to everything (cv2x) communication. The communication between two OBU devices is implemented by the cv2x protocol. With regard to a vehicle without an OBU device installed on, even if other vehicles are installed with the OBU device, cv2x communication cannot be performed between the two vehicles, and thus an application related to V2V, such as collision early-warning, cannot be implemented.

SUMMARY

The following is a summary of the subject matter described in detail herein. This summary is not intended to limit the scope of the claims.

The embodiments of the present disclosure provide an information interaction method, a server, a non-OBU onboard terminal, and a computer readable storage medium.

According to a first aspect of an embodiment of the present disclosure, an embodiment of the present disclosure provides an information interaction method, applied to a server, the method comprising: at least two pieces of vehicle information are acquired, wherein at least one piece of the vehicle information is from a non-onboard unit (OBU) onboard terminal; a vehicle early-warning information is generated according to the at least two pieces of vehicle information; and the vehicle early-warning information is sent to the non-OBU onboard terminal, so that the non-OBU onboard terminal pushes early-warning notification information according to the vehicle early-warning information.

According to a second aspect of an embodiment of the present disclosure, an embodiment of the present disclosure further provides an information interaction method, applied to a non-OBU onboard terminal, the method comprising: a vehicle information is acquired; the vehicle information is sent to a server, so that the server generates vehicle early-warning information according to the vehicle information; the vehicle early-warning information is acquired from a server; and early-warning notification information is pushed according to the vehicle early-warning information.

According to a third aspect of an embodiment of the present disclosure, an embodiment of the present disclosure further provides a server, comprising: a memory, a processor, and a computer program stored in the memory and capable of running on the processor, wherein when executing the computer program, the processor implements the information interaction method according to the first aspect of an embodiments of the present disclosure.

According to a fourth aspect of an embodiment of the present disclosure, an embodiment of the present disclosure further provides a non-OBU onboard terminal, comprising: a memory, a processor, and a computer program stored in the memory and capable of running on the processor, when executing the computer program, the processor implements the information interaction method according to the second aspect of an embodiment of the present disclosure.

According to a fifth aspect of an embodiment of the present disclosure, an embodiment of the present disclosure further provides a computer readable storage medium which stores computer executable instructions, the computer executable instructions being configured to execute the information interaction method.

Additional features and advantages of the present disclosure will be set forth in the following description, and in part will be obvious from the description, or may be learned by implementing the embodiments of the present disclosure. The objectives and other advantages of the present disclosure can be achieved and obtained by the structures particularly pointed out in the description, claims and drawings.

BRIEF DESCRIPTION OF THE DRAWINGS

The drawings are used for providing further understanding of the technical solutions of the present disclosure and constitute a part of the specification, and are used for explaining the technical solutions of the present disclosure together with the embodiments of the present disclosure, rather than constitute limitation on the technical solutions of the present disclosure.

FIG. 3 is a schematic structural diagram of a message about vehicle information provided in an embodiment of the present disclosure;

FIG. 4 is a schematic structural diagram of a message about a global navigation satellite system information field provided in an embodiment of the present disclosure;

FIG. 5 is a schematic structural diagram of a message about vehicle early-warning information provided in an embodiment of the present disclosure;

FIG. 6 is a flowchart of an information interaction method provided in another embodiment of the present disclosure;

FIG. 7 is a flowchart of an information interaction method provided in another embodiment of the present disclosure;

FIG. 8 is a flowchart of an information interaction method provided in another embodiment of the present disclosure;

FIG. 9 is a flowchart of an information interaction method provided in another embodiment of the present disclosure;

FIG. 10 is a flowchart of an information interaction method provided in another embodiment of the present disclosure;

FIG. 11 is a schematic structural diagram of a message about road test point information according to an embodiment of the present disclosure;

DETAILED DESCRIPTION OF THE EMBODIMENTS

To make the objectives, technical solutions, and advantages of the present disclosure clearer, hereinafter, the present disclosure is further described in detail in conjunction with the drawings and embodiments. It should be understood that the specific embodiments described herein are only intended to explain the present disclosure, but not to limit the present disclosure.

It should be noted that, although functional module division is performed in a schematic diagram of the apparatus and a logic sequence is shown in the flowchart, in some cases, the shown or described steps may be executed in a module division different from that in the apparatus and in a sequence different from that in the flowchart. It should be noted that the terms "first", "second" etc. in the description, claims, and accompanying drawings are used to distinguish similar objects, and are not necessarily used to describe a specific sequence or order.

The present disclosure provides an information interaction method, a server, a non-OBU onboard terminal, and a computer-readable storage medium. Vehicles without an OBU device installed on can use a non-OBU onboard terminal to send vehicle information to the server. Then, the server can generate vehicle early-warning information according to a plurality of pieces of vehicle information including at least one piece of vehicle information from the non-OBU onboard terminal, and can send the vehicle early-warning information to the non-OBU onboard terminal, so that the vehicles without an OBU device installed on can use the non-OBU onboard terminal to acquire the vehicle early-warning information generated by a server after calculation, thereby pushing early-warning notification information to a user according to the vehicle early-warning information. Therefore, in the embodiment of the present disclosure, vehicles without an OBU device installed on can also implement a V2V-related application.

The embodiments of the present disclosure will be further described below with reference to the accompanying drawings.

Figure 1:
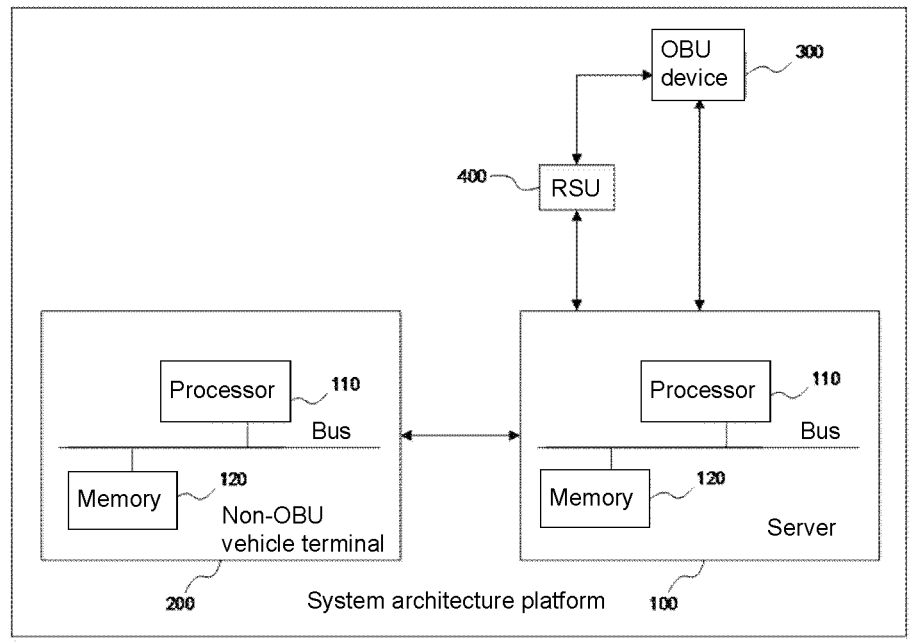
FIG. 1 is a schematic diagram of a system architecture platform configured to execute an information interaction method provided in an embodiment of the present disclosure.

As shown in FIG. 1, FIG. 1 is a schematic diagram of a system architecture platform configured to execute an information interaction method provided in an embodiment of the present disclosure.

In the example of FIG. 1, the system architecture platform comprises a server 100, a non-OBU onboard terminal 200, an OBU device 300 and a road side unit (RSU) 400. The server 100 and the non-OBU onboard terminal 200 are both provided with a memory 110 and a processor 120. The memory 110 and the processor 120 may be connected by using a bus or in other manners. In FIG. 1, connecting by using a bus is taken as an example.

As a non-transitory computer readable storage medium, the memory 110 may be configured to store a non-transitory software program and a non-transitory computer executable program. In addition, the memory 100 may comprise a cache random access memory, and may further comprise a non-transient memory, for example, at least one magnetic disk storage device, a flash memory device, or other non-transient solid-state storage device. In some embodiments, the memory 110 may include memories that are remotely located with respect to the processor 120, and these remote memories may be connected to the system architecture platform over a network. Examples of the described network include, but are not limited to the Internet, an intranet, a local area network, a mobile communication network, and a combination thereof.

In some cases, the V2V communication technology is an important vehicle networking technology. V2V refers to performing communications, for example, collision early-warning or blind area early-warning, between vehicles, so as to achieve the objectives of reducing traffic accidents and improving traffic efficiency. In order to implement V2V communication, vehicles need to install an OBU device 300 that supports cv2x communication. The communication between two OBU devices 300 is implemented by the cv2x protocol. Since the v2V communication technology is popularized for a certain period, for the existing market, some vehicles are still not installed with the OBU device 300, and some individuals do not install the OBU device 300 due to the cost problem or other reasons. Therefore, with regard to a vehicle without an OBU device 300 installed on, even if other vehicles are installed with the OBU device 300, cv2x communication cannot be performed between the two vehicles, and thus an application related to V2V, such as collision early-warning, cannot be implemented.

Therefore, based on the described situation, in the system architecture platform provided in the example of FIG. 1, vehicles without an OBU device 300 installed on can use a non-OBU onboard terminal 200 to send vehicle information to the server 100. Then, the server 100 can generate vehicle early-warning information according to a plurality of pieces of vehicle information including at least one piece of vehicle information from the non-OBU onboard terminal 200, and can send the vehicle early-warning information to the non-OBU onboard terminal 200, so that the vehicles without an OBU device installed on can use the non-OBU onboard terminal 200 to acquire the vehicle early-warning information generated by the server 100 after calculation, thereby pushing early-warning notification information to a user according to the vehicle early-warning information. Therefore, in the embodiment of the present disclosure, vehicles without the OBU device 300 installed on may also implement V2V-related applications, such as vehicle collision early-warning, so as to achieve the objectives of reducing traffic accidents and improving traffic efficiency.

A person skilled in the art may understand that the system architecture platform may be applied to a 3G communications network system, an LTE communications network system, a 5G communications network system, a subsequent evolved mobile communications network system, etc. which is not specifically limited in the present embodiment.

A person skilled in the art may understand that the system architecture platform shown in FIG. 1 does not limit the embodiments of the present disclosure, and may comprise more or fewer components than those shown in the FIG., or be combined with some components, or have different component arrangements.

In the system architecture platform shown in FIG. 1, the processor 120 may invoke an information interaction program stored in the memory 110, so as to execute an information interaction method.

Based on the foregoing system architecture platform, various embodiments of the information interaction method of the present disclosure are proposed as below.

Figure 2:
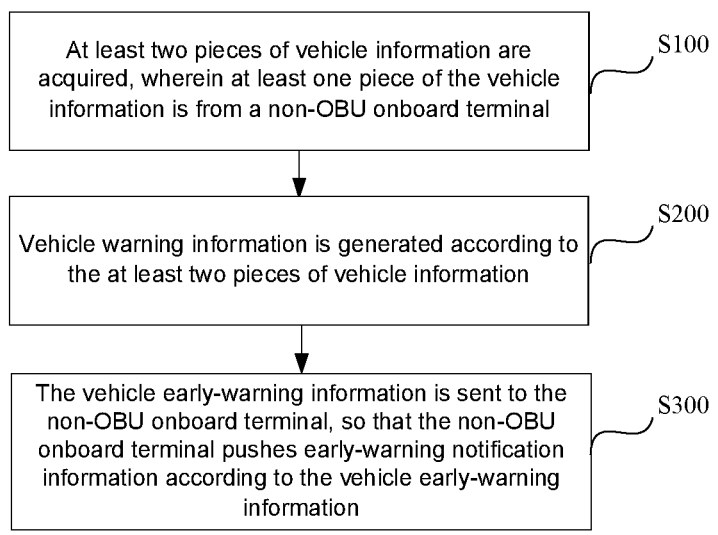
FIG. 2 is a flowchart of an information interaction method provided in an embodiment of the present disclosure.

As shown in FIG. 2, FIG. 2 is a flowchart of an information interaction method provided in an embodiment of the present disclosure. The information interaction method may be applied to a server, and includes, but is not limited to, step S100, step S200, and step S300.

Step S100: at least two pieces of vehicle information are acquired, wherein at least one piece of the vehicle information is from a non-OBU onboard terminal.

In an embodiment, the at least two pieces of vehicle information may include but are not limited to the following two combinations: a first combination including vehicle information from at least two non-OBU onboard terminals; and a second combination including vehicle information from at least one non-OBU-mounted terminal and vehicle information from at least one OBU device.

It should be noted that the vehicle information of the non-OBU onboard terminal is sent to the server over the wireless network; the vehicle information of the OBU device may be sent to the server over a wireless network, and may also be sent to the server through an RSU. The method for the OBU device to send the vehicle information to the server by using the RSU may specifically be embodied as: the OBU device broadcasting the vehicle information to the RSU by using the cv2x, and then the RSU sending the vehicle information to the server by using the Ethernet.

In addition, in order to realize uninterrupted information interaction and vehicle early-warning monitoring, a non-OBU onboard terminal may periodically send vehicle information to a server.

It should be noted that the vehicle information includes but is not limited to vehicle identity information and vehicle positioning information. The vehicle positioning information includes, but is not limited to, longitude information, latitude information, elevation information, vehicle speed information, heading angle information, and positioning time information. In addition, in order to improve the accuracy of subsequent early-warning, the vehicle information further comprises vehicle body length information and vehicle body width information.

For the packet structure of the vehicle information, a specific example is used for description as follows.

As shown in FIG. 3, in an embodiment, the packet structure of the vehicle information includes a vehicle ID field, a global navigation satellite system (GNSS) information field, a vehicle body length field, and a vehicle body width field. In the packet structure, the fields are explained as follows:

vehicle ID field: set to be filled with vehicle identity information of a vehicle;

GNSS information field: set to be filled with vehicle positioning information of a vehicle;

vehicle body length field: set to be filled with vehicle body length information of a vehicle;

vehicle body width field: set to be filled with vehicle body width information of a vehicle.

As shown in FIG. 4, in an embodiment, the described GNSS information field in FIG. 3 specifically includes a longitude field, a latitude field, an elevation field, a vehicle speed field, a heading angle field, and a global positioning system (GPS) time field. In the packet structure, the fields are explained as follows:

longitude field: set to be filled with longitude information of a vehicle;

latitude field: set to be filled with latitude information of a vehicle;

elevation field: set to be filled with elevation information of a vehicle;

vehicle speed field: set to be filled with in vehicle speed information of a vehicle; heading angle field: set to be filled with heading angle information of a vehicle;

GPS time field: set to be filled with positioning time information of a vehicle.

It may be understood that, the foregoing non-OBU onboard terminal refers to an onboard terminal other than an OBU device, for example, an onboard terminal such as a telematics BOX (TBOX) or a mobile phone, which is not specifically limited in the present embodiment.

Step S200, vehicle warning information is generated according to the at least two pieces of vehicle information.

In an embodiment, after acquiring a plurality of vehicle information, a server predicts a collision risk among a plurality of vehicles according to the acquired plurality of pieces of vehicle information and a preset collision algorithm, and when there is a collision risk, the server generates vehicle early-warning information in response.

It should be noted that, the vehicle early-warning information may be obtained in, but is not limited to, the following manners: a first manner: generating by vehicle information sent by at least two non-OBU onboard terminals; in the first manner, the embodiment of the present disclosure may implement collision early-warning between two vehicles without an OBU device installed on. A second manner: generating by vehicle information sent by at least one non-OBU onboard terminal and vehicle information sent by at least one OBU device; in the second manner, the embodiment of the present disclosure may implement collision early-warning between a vehicle without an OBU device installed on and a vehicle having an OBU device installed on.

It should be noted that the vehicle early-warning information includes, but is not limited to, identity information and collision prediction time of the predicted collision vehicle, wherein the identity information of the predicted collision vehicle includes vehicle identity information of at least two vehicles. In addition, the described vehicle early-warning information may also comprise positioning information and early-warning type of the predicted collision vehicle, wherein the early-warning type includes, but is not limited to, a collision early-warning type and an avoidance early-warning type.

For the packet structure of the vehicle early-warning information, a specific example is used for description as follows.

As shown in FIG. 5, in one embodiment, a packet structure of vehicle early-warning information comprises an early-warning type field, a first vehicle ID field, a first vehicle GNSS information field, a second vehicle ID field, a second vehicle GNSS information field, and a collision prediction time field. In the packet structure, the fields are explained as follows:

early-warning type field: set to be filled with an early-warning type of a vehicle;

first vehicle ID field: set to be filled with identity information of a first predicted collision vehicle;

first vehicle GNSS information field: set to be filled with positioning information of a first predicted collision vehicle;

second vehicle ID field: set to be filled with identity information of a second predicted collision vehicle;

second vehicle GNSS information field: set to be filled with positioning information of a second predicted collision vehicle; collision prediction time field: set to be filled with collision prediction time when two vehicles predicted to have a collisions collide.

Step S300: the vehicle early-warning information is sent to the non-OBU onboard terminal, so that the non-OBU onboard terminal pushes early-warning notification information according to the vehicle early-warning information.

In an embodiment, after vehicle early-warning information is generated, the server sends the vehicle early-warning information to a non-OBU onboard terminal, and the non-OBU onboard terminal pushes early-warning notification information to a user according to the received vehicle early-warning information.

It should be noted that the non-OBU onboard terminal pushes the early-warning notification information according to the vehicle early-warning information, and there are two pushing situations as follows:

a first pushing situation: in a case that the identity information of the predicted collision vehicle in the vehicle warning information comprises the vehicle identity information in the vehicle information, it is indicated that the vehicle where the current non-OBU onboard terminal is located is a predicted collision vehicle; therefore, the non-OBU onboard terminal pushes the collision early-warning information in response, so as to prompt a user to avoid a collision; and a second pushing situation: in a case that the identity information of the predicted collision vehicle in the vehicle warning information does not comprise the vehicle identity information in the vehicle information, and when the distance between the vehicle corresponding to the vehicle information and the vehicle corresponding to the vehicle early-warning information is less than a preset distance, it indicates that the distance between the vehicle where the current non-OBU onboard terminal is located and the predicted collision vehicle is relatively short; therefore, the non-OBU onboard terminal pushes avoidance early-warning information in response, so as to prompt a user to avoid in time.

It may be understood that, the manners for the non-OBU onboard terminal to push the early-warning notification information includes, but is not limited to, popup on a screen for display, voice broadcast, etc.

In an embodiment, as the information interaction method uses the described steps S100, S200 and S300, a vehicle without an OBU device installed on may use a non-OBU onboard terminal to send vehicle information to a server, and then the server may generate vehicle early-warning information according to the vehicle information including vehicle information from the non-OBU onboard terminal, and may send the vehicle early-warning information to the non-OBU onboard terminal, so that the vehicles without an OBU device installed on can use the non-OBU onboard terminal to acquire the vehicle early-warning information generated by a server after calculation, thereby pushing early-warning notification information to a user according to the vehicle early-warning information. Therefore, in the embodiment of the present disclosure, vehicles without the OBU device installed on may also implement V2V-related applications, such as vehicle collision early-warning, so as to achieve the objectives of reducing traffic accidents and improving traffic efficiency.

It should be noted that, in order to satisfy the low latency required by a V2V-related application, the non-OBU onboard terminal and the server in the embodiment of the present disclosure may communicate with each other by using a 5G network. In addition, the server may be a mobile edge computing (MEC) server. As the 5G communication has low latency and high reliability, an end-to-end delay of a millisecond level and a service reliability guarantee close to 100% may be provided for a user. Ideally, the end-to-end delay is 1 ms, and the typical end-to-end delay is about 5-10 ms. In addition, the MEC technology performs deep fusion of a base station and an Internet service on the basis of a 5G evolving architecture. The MEC pushes calculation, processing and storage to a moving boundary, and logically does not rely on other parts of a network; on the one hand, an infinite possibility is provided for service innovation of a mobile edge entrance; and on the other hand, massive data can be processed in real time and quickly, so as to reduce time delay. Therefore, in the embodiments of the present disclosure, by combining the 5G network and the MEC technology, low-delay communication at millisecond level required by the V2V application can be completely satisfied, the collision early-warning problem of the vehicle without the OBU installed on can be well solved, improving the traffic safety.

In addition, referring to FIG. 6, in an embodiment, when the vehicle early-warning information includes positioning information of the predicted collision vehicle, step S300 includes but is not limited to step S400.

Step S400: the vehicle early-warning information is sent to a non-OBU onboard terminal within a preset distance range from the predicted collision vehicle.

In an embodiment, after the server generates the vehicle early-warning information, the server may also send the vehicle early-warning information to all non-OBU onboard terminals within a certain distance range around the server according to the positioning location of the predicted collision vehicle in the vehicle early-warning information. Specifically, when the non-OBU onboard terminal in the predicted collision vehicle receives the vehicle early-warning information, the non-OBU onboard terminal in the predicted collision vehicle may push the collision early-warning information to the user in response, so as to prompt the user to avoid a collision. When the non-OBU onboard terminal in a vehicle near the predicted collision vehicle receives the vehicle early-warning information, the non-OBU onboard terminal in the nearby vehicle may push the avoidance early-warning information to the user in response, so as to prompt the user to avoid in time.

It should be noted that the predicted collision vehicle refers to a vehicle predicted to have a collision while the vehicle continues to travel. Exemplarily, when a current vehicle is traveling, if a leading vehicle is a predicted collision vehicle, the server sends vehicle early-warning information to a non-OBU onboard terminal in the current vehicle, so that the non-OBU onboard terminal in the current vehicle pushes avoidance early-warning information to a user in response, so as to prompt the user to avoid in time.

In addition, referring to FIG. 7, in an embodiment, the information interaction method further includes but is not limited to step S500.

Step S500: the vehicle early-warning information is sent to an OBU device over a wireless network.

In an embodiment, after the server generates the vehicle early-warning information, the server may also send the vehicle early-warning information to the OBU device over a wireless network, and the OBU device may push the early-warning notification information to the user according to the received vehicle early-warning information.

It should be noted that, the OBU device for acquiring the vehicle early-warning information may be an OBU device installed on a predicted collision vehicle, and may also be an OBU device installed on a nearby vehicle of the predicted collision vehicle; therefore, for the specific implementation in the embodiment of the present disclosure of pushing the early-warning notification information by the OBU device according to the vehicle early-warning information and corresponding technical effects, reference may be made to the embodiment of pushing the early-warning notification information by the non-OBU onboard terminal according to the vehicle early-warning information.

In addition, referring to FIG. 8, in an embodiment, the information interaction method further includes but is not limited to step S600.

Step S600: the vehicle early-warning information is sent to an OBU device by using an RSU.

In an embodiment, after the server generates the vehicle early-warning information, the server may further send the vehicle early-warning information to the RSU over the Ethernet, then the RSU further sends the vehicle early-warning information to the OBU device over the cv2x, and then the OBU device may push the early-warning notification information to the user according to the received vehicle early-warning information.

It should be noted that, the OBU device for acquiring the vehicle early-warning information may be an OBU device installed on a predicted collision vehicle, and may also be an OBU device installed on a nearby vehicle of the predicted collision vehicle; therefore, for the specific implementation in the embodiment of the present disclosure of pushing the early-warning notification information by the OBU device according to the vehicle early-warning information and corresponding technical effects, reference may be made to the embodiment of pushing the early-warning notification information by the non-OBU onboard terminal according to the vehicle early-warning information.

In addition, referring to FIG. 9, in an embodiment, step S600 includes but is not limited to step S710 and step S720.

Step S710, a target RSU is determined according to positioning information of a predicted collision vehicle in vehicle early-warning information.

Step S720: the vehicle early-warning information is sent to the OBU device by using the target RSU.

In an embodiment, after the server generates vehicle early-warning information, the server may determine a target RSU closest to a predicted collision vehicle according to positioning information of a predicted collision vehicle in vehicle early-warning information, and then broadcast the vehicle early-warning information by means of the target RSU, so as to send the vehicle early-warning information to the predicted collision vehicle and other vehicles near the predicted collision vehicle. As the embodiment of the present disclosure can send the vehicle early-warning information to the OBU device by means of the target RSU closest to the predicted collision vehicle, the vehicle early-warning information can be accurately sent to the vehicles around collision prediction location.

It can be understood that the server communicates with the target RSU over the Ethernet, and the target RSU communicates with the OBU over the cv2x.

In addition, referring to FIG. 10, in an embodiment, when it needs to send the road test point information to the server to cooperate with the vehicle information to generate the vehicle early-warning information, the information interaction method comprises but is not limited to steps S810 and S820.

Step S810, the road test point information and at least two pieces of vehicle information are acquired, wherein the at least one piece of vehicle information is from a non-OBU onboard terminal.

Step S820, the vehicle early-warning information is generated according to the road test point information and the at least two pieces of vehicle information.

In an embodiment, the RSU may send the road test point information to the server over the Ethernet, and at the same time, a vehicle without an OBU device installed on may use a non-OBU onboard terminal to send vehicle information to the server, and then the server may generate vehicle early-warning information according to the road test point information and a plurality of pieces of vehicle information including the vehicle information from the non-OBU onboard terminal. After the vehicle early-warning information is generated, the server may send the vehicle early-warning information to the non-OBU onboard terminal over the wireless network, may also send the vehicle early-warning information to the OBU device over the wireless network, and may also send the vehicle early-warning information to the OBU device by means of the RSU, and then the non-OBU onboard terminal and the OBU device may both push the early-warning notification information to the user according to the vehicle early-warning information. Therefore, in the embodiment of the present disclosure, vehicles without the OBU device installed on may also implement V2V-related applications, such as vehicle collision early-warning, so as to achieve the objectives of reducing traffic accidents and improving traffic efficiency.

It should be noted that the step S810 is complementary to the step S100 above, and correspondingly, the step S820 is also complementary to the step S200 above. The road test point information sent by the RSU is added in the steps 810 and 820. Since the RSU can monitor an abnormal condition of a road, provide differential positioning for passing vehicles, make data redundant, share calculation amounts, etc. The embodiments of the present disclosure can improve the accuracy of vehicle early-warning information by using the road test point information.

It should be noted that the road test point information is obtained by means of an RSU, and includes, but is not limited to, RSU identity information and RSU positioning information. The RSU positioning information includes, but is not limited to, longitude information, latitude information, and positioning time information.

For the packet structure of the road test point information, a specific example is used for description as follows:

As shown in FIG. 11, in an embodiment, the packet structure of the road test point information includes an RsuId field, a longitude field, a latitude field, and a GPS time field. In the packet structure, the fields are explained as follows:

RsuId field: set to be filled with RSU identity information;
longitude field: set to be filled with longitude information of the RSU;
latitude field: set to be filled with latitude information of the RSU;
GPS time field: set to be filled with positioning time information of the RSU.

Figure 12:
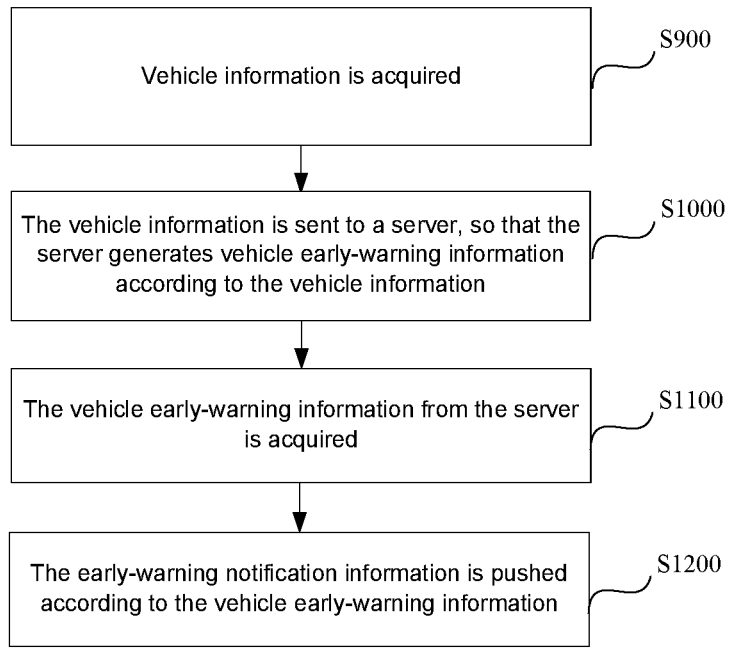
FIG. 12 is a flowchart of an information interaction method provided in another embodiment of the present disclosure.

As shown in FIG. 12, FIG. 12 is a flowchart of an information interaction method provided in an embodiment of the present disclosure. The information interaction method may be applied to a non-OBU onboard terminal, and includes, but is not limited to, step S900, step S1000, step S1100, and step S1200:

step S900, vehicle information is acquired;
step S1000, the vehicle information is sent to a server, so that the server generates vehicle early-warning information according to the vehicle information;
step S1100, the vehicle early-warning information from the server is acquired; and
step S1200, the early-warning notification information is pushed according to the vehicle early-warning information.

In an embodiment, a vehicle without an OBU device installed on may use a non-OBU onboard terminal to send vehicle information to a server; the server may generate vehicle early-warning information according to a plurality of pieces of vehicle information comprising vehicle information from the non-OBU onboard terminal; and then the non-OBU onboard terminal may acquire the vehicle early-warning information generated by calculating by the server, and may push early-warning notification information to a user according to the vehicle early-warning information. Therefore, in the embodiment of the present disclosure, vehicles without the OBU device installed on may also implement V2V-related applications, such as vehicle collision early-warning, so as to achieve the objectives of reducing traffic accidents and improving traffic efficiency.

It should be noted that, for specific implementations of the information interaction method and corresponding technical effects, reference may be made to the foregoing embodiments of the information interaction method.

Figure 13:
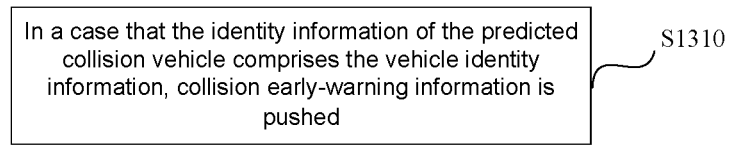
FIG. 13 is a flowchart of an information interaction method provided in another embodiment of the present disclosure.
Figure 14:
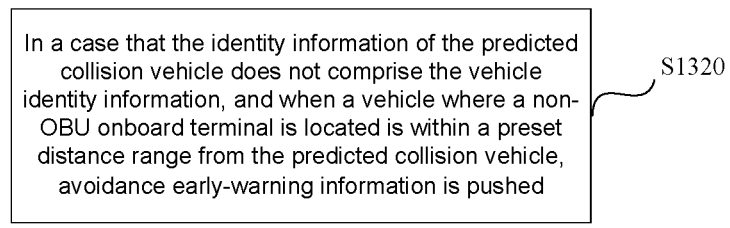
FIG. 14 is a flowchart of an information interaction method provided in another embodiment of the present disclosure.

In addition, referring to FIGS. 13 and 14, in an embodiment, vehicle information comprises vehicle identity information, and the vehicle early-warning information comprises identity information about a predicted collision vehicle. Step S1200 includes, but is not limited to, step S1310 or step S1320.

Step S1310, in a case that the identity information of the predicted collision vehicle comprises the vehicle identity information, collision early-warning information is pushed.

In an embodiment, in a case that the identity information of the predicted collision vehicle includes the vehicle identity information, it is indicated that the vehicle where the current non-OBU onboard terminal is located is a predicted collision vehicle; therefore, the non-OBU onboard terminal responds to the pushing the collision early-warning information, so as to prompt a user to avoid a collision.

Step S1320: in a case that the identity information of the predicted collision vehicle does not comprise the vehicle identity information, and when a vehicle where a non-OBU onboard terminal is located is within a preset distance range from the predicted collision vehicle, avoidance early-warning information is pushed.

In an embodiment, in a case that the identity information of the predicted collision vehicle does not comprise the vehicle identity information, and when the distance between the vehicle corresponding to the vehicle information and the vehicle corresponding to the vehicle early-warning information is less than a preset distance, it indicates that the distance between the vehicle where the current non-OBU onboard terminal is located and the predicted collision vehicle is relatively short; therefore, the non-OBU onboard terminal pushes avoidance early-warning information in response, so as to prompt a user to avoid in time.

It may be understood that, in the embodiment of the present disclosure, the distance between a vehicle where the current non-OBU onboard terminal is located and a predicted collision vehicle may be obtained by using the vehicle positioning information in the vehicle information and the positioning information of the predicted collision vehicle in the vehicle early-warning information.

Figure 15:
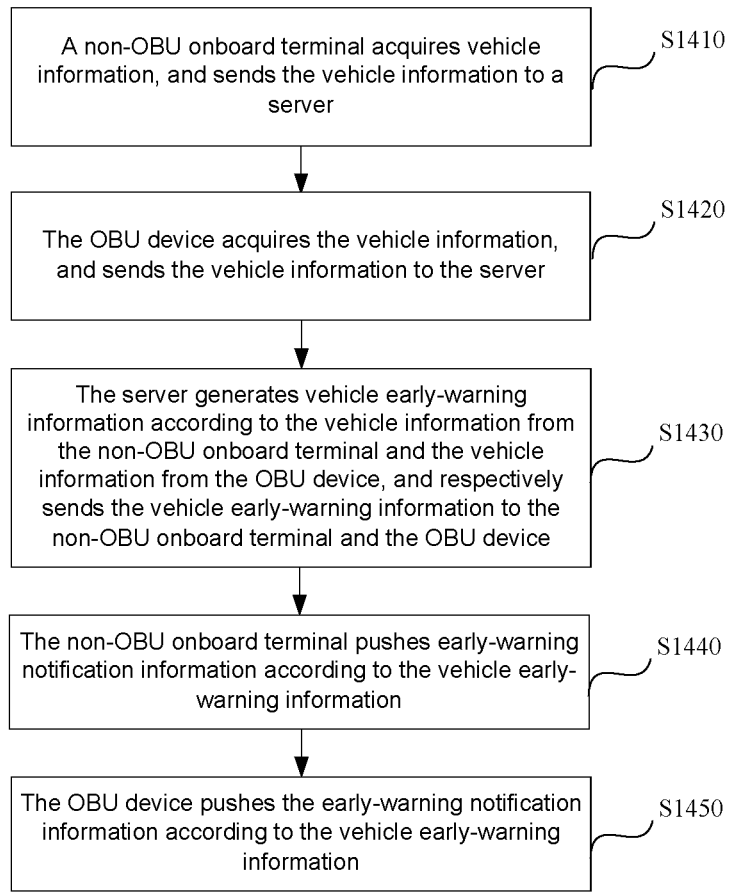
FIG. 15 is a flowchart of an information interaction method provided in another embodiment of the present disclosure.

As shown in FIG. 15, FIG. 15 is a flowchart of an information interaction method provided in an embodiment of the present disclosure. The information interaction method may be applied to the Internet of Vehicles system, and includes, but is not limited to, step S1410, step S1420, step S1430, step S1440, and step S1450:

step S1410, a non-OBU onboard terminal acquires vehicle information, and sends the vehicle information to a server;
step S1420, the OBU device acquires the vehicle information, and sends the vehicle information to the server;
step S1430, the server generates vehicle early-warning information according to the vehicle information from the non-OBU onboard terminal and the vehicle information from the OBU device, and respectively sends the vehicle early-warning information to the non-OBU onboard terminal and the OBU device;
step S1440, the non-OBU onboard terminal pushes early-warning notification information according to the vehicle early-warning information;
step S1450, the OBU device pushes the early-warning notification information according to the vehicle early-warning information.

In an embodiment, a vehicle without an OBU device installed on may use a non-OBU onboard terminal to send vehicle information to a server; meanwhile, a vehicle installed with the OBU device may use the OBU device to send the vehicle information to the server; then, the server may generate vehicle early-warning information according to vehicle information from the non-OBU onboard terminal and the vehicle information from the OBU device, and send the vehicle early-warning information to the non-OBU onboard terminal and the OBU device, which is not only enable the vehicle installed with the OBU device to push early-warning notification information to a user according to the vehicle early-warning information, but also enable the vehicle without a OBU device installed on may also push the early-warning notification information to the user according to the vehicle early-warning information. Therefore, in the embodiments of the present disclosure, a V2V-related application, such as vehicle collision early-warning, can be implemented between a vehicle without an OBU device installed on and a vehicle with an OBU device installed on, so as to achieve the objectives of reducing traffic accidents and improving traffic efficiency.

It should be noted that the non-OBU onboard terminal and the server communicate with each other over a wireless network, and the OBU device and the server may communicate with each other directly over the wireless network or indirectly by means of the RSU.

Figure 16:
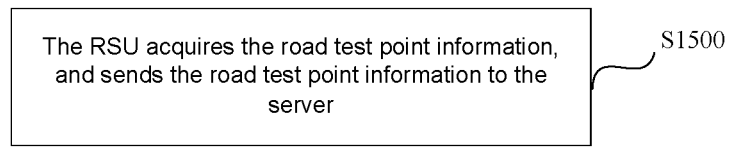
FIG. 16 is a flowchart of an information interaction method provided in another embodiment of the present disclosure.

In addition, referring to FIG. 16, in an embodiment, when it needs to send the road test point information to the server to cooperate with the vehicle information to generate the vehicle early-warning information, the information interaction method also comprises but is not limited to steps S1500.

Step S1500: the RSU acquires the road test point information, and sends the road test point information to the server.

Correspondingly, the step S1430 should corresponding comprise: the server generating vehicle early-warning information according to the vehicle information from the non-OBU onboard terminal, the vehicle information the OBU device and the rode test point information from the RSU, and sends the vehicle early-warning information to the non-OBU onboard terminal and the OBU device respectively.

It should be noted that, for specific implementations of the information interaction method and corresponding technical effects, reference may be made to the foregoing embodiments of the information interaction method.

Based on the foregoing information exchange method, the embodiments of the server, the non-OBU onboard terminal, and the computer readable storage medium according to the present disclosure are respectively provided as follows.

In addition, an embodiment of the present disclosure provides a server, and the server includes: a memory, a processor, and a computer program that is stored in the memory and can run on the processor.

The processor and the memory may be connected by a bus or other means.

It should be noted that, the server in the present embodiment may be applied to a system architecture platform in the embodiment shown in FIG. 1. The server in the present embodiment can form a part of the system architecture platform in the embodiment shown in FIG. 1. The two servers belong to the same inventive concept, and therefore have the same implementation principle and beneficial effects, and it will not be described herein again.

A non-transitory software program and instructions required for realizing the information interaction method of the described embodiments are stored in a memory, and when being executed by a processor, the information interaction method of the described embodiments is executed, for example, executing the method steps S100 to S300 in FIG. 2, the method step S400 in FIG. 6, the method step S500 in FIG. 7, the method step S600 in FIG. 8, the method steps S710 to S720 in FIG. 9, and the method steps S810 to S820 in FIG. 10.

In addition, an embodiment of the present disclosure further provides a non-OBU onboard terminal. The non-OBU onboard terminal comprises a memory, a processor, and a computer program that is stored in the memory and runs on the processor.

The processor and the memory may be connected by a bus or other means.

It should be noted that, the non-OBU onboard terminal in the present embodiment may be applied to a system architecture platform in the embodiment shown in FIG. 1. The non-OBU onboard terminal in the present embodiment can form a part of the system architecture platform in the embodiment shown in FIG. 1, and the two belong to the same inventive concept, and therefore have the same implementation principle and beneficial effect. It will not described in detail herein.

A non-transitory software program and instructions required for realizing the information interaction method of the described embodiments are stored in a memory, and when being executed by a processor, the information interaction method of the described embodiments is executed, for example, executing the method steps S900 to 1200 in FIG. 12, the method step S1310 in FIG. 13, and the method step S1320 in FIG. 14.

The apparatus embodiments as described above are merely schematic, in which the units described as separate components may or may not be physically separated, i.e. may be located in one position, or may be distributed to a plurality of network units. Some or all of the modules may be selected according to actual needs to achieve the purpose of the solutions of the embodiments.

In addition, an embodiment of the present disclosure further provides a computer readable storage medium. The computer readable storage medium stores computer executable instructions, and the computer executable instructions are used for executing the described information interaction method. For example, the computer executable instructions are executed by one processor in the described server embodiments, so that the processor is caused to execute the information interaction method in the described embodiment, for example, executing the method steps S100 to S300 in FIG. 2, the method step S400 in FIG. 6, the method step S500 in FIG. 7, the method step S600 in FIG. 8, the method steps S710 to S720 in FIG. 9, and the method steps S810 to S820 in FIG. 10. For another example, the computer executable instructions are executed by one processor in the described non-OBU onboard terminal embodiment, so that the processor is caused to execute the information interaction method in the described embodiment, for example, executing the method steps S900 to 1200 in FIG. 12, the method step S1310 in FIG. 13, and the method step S1320 in FIG. 14.

The embodiments of the present disclosure comprise: a server acquires at least two pieces of vehicle information, wherein at least one piece of the vehicle information is from a non-OBU onboard terminal; then, the server generates vehicle early-warning information according to the vehicle information, and sends the vehicle early-warning information to the non-OBU onboard terminal, so that the non-OBU onboard terminal pushes early-warning notification information according to the vehicle early-warning information. According to the solution provided in the embodiments of the present disclosure, a vehicle without an OBU device installed on may use a non-OBU onboard terminal to send vehicle information to a server, and then the server may generate vehicle early-warning information according to the vehicle information including vehicle information from the non-OBU onboard terminal, and may send the vehicle early-warning information to the non-OBU onboard terminal, so that the vehicles without an OBU device installed on can use the non-OBU onboard terminal to acquire the vehicle early-warning information generated by a server after calculation, thereby pushing early-warning notification information to a user according to the vehicle early-warning information. Therefore, in the embodiment of the present disclosure, vehicles without the OBU device installed on may also implement V2V-related applications, such as vehicle collision early-warning, so as to achieve the objectives of reducing traffic accidents and improving traffic efficiency.

A person of ordinary skill in the art could understand that all or some of the operations and systems of the methods disclosed above can be implemented as software, firmware, hardware, and any suitable combination thereof. Some or all of the physical components may be implemented as software executed by a processor, such as a central processing unit, a digital signal processor, or a microprocessor, or implemented as hardware, or implemented as an integrated circuit, such as an application specific integrated circuit. Such software may be distributed on a computer-readable medium which may include a computer storage medium (or non-transitory medium) and a communication medium (or transitory medium). As is well known to a person of ordinary skill in the art, the term "computer storage medium" includes transitory and non-transitory, removable and non-removable medium implemented in any method or technology for storing information (such as computer-readable instructions, data structures, program modules, or other data). The computer storage medium includes but is not limited to, RAM, ROM, EEPROM, flash memory or other memory technology, CD-ROM, digital versatile disk (DVD) or other optical disk storage, magnetic cassettes, magnetic tapes, magnetic disk storage or other magnetic storage apparatuses, or any other medium which can be used to store desired information and can be accessed by a computer. In addition, as is well known to a person of ordinary skill in the art, the communication medium typically includes computer-readable instructions, data structures, program modules, or other data in a modulated data signal such as a carrier or other transmission mechanisms, and may include any information delivery medium.

The content above makes specific explanation on some embodiments of the present disclosure, but the present disclosure is not limited thereto. A person skilled in the art could also make equivalent modifications or replacements without departing from the sharing condition of the scope of the present disclosure, and these equivalent modifications or replacements are all included in the scope defined by the claims of the present disclosure.

What is claimed is:

1. A method for information interaction, applied to a server, comprising:
   acquiring at least two pieces of vehicle information, wherein at least one piece of the vehicle information is from a non-onboard unit (non-OBU) onboard terminal;
   generating vehicle early-warning information according to the at least two pieces of vehicle information; and
   sending the vehicle early-warning information to the non-OBU onboard terminal, so that the non-OBU onboard terminal pushes early-warning notification information according to the vehicle early-warning information;
   determining a target RSU according to positioning information of a predicted collision vehicle in the vehicle early-warning information, sending the vehicle early-warning information to a onboard unit (OBU) device by using the target RSU.

2. The method for information interaction according to claim 1, wherein the sending the vehicle early-warning information to a non-OBU onboard terminal comprises:
   sending the vehicle early-warning information to a non-OBU onboard terminal within a preset distance range from the predicted collision vehicle.

3. The method for information interaction according to claim 1, wherein the vehicle information comprises vehicle identity information and vehicle positioning information.

4. The method for information interaction according to claim 2, wherein the vehicle early-warning information further comprises identity information and collision prediction time of the predicted collision vehicle.

5. A server, comprising a memory, a processor and a computer program stored in the memory and capable of running on the processor, wherein when executing the computer program, the processor implements the method for information interaction as claimed in claim 1.

6. A non-transitory computer-readable storage medium, storing computer-executable instructions, wherein the computer-executable instructions are configured to execute the method for information interaction as claimed in claim 1.

7. A server, comprising a memory, a processor and a computer program stored in the memory and capable of running on the processor, wherein when executing the computer program, the processor implements the method for information interaction as claimed in claim 2.

8. A server, comprising a memory, a processor and a computer program stored in the memory and capable of running on the processor, wherein when executing the computer program, the processor implements the method for information interaction as claimed in claim 3.

9. A server, comprising a memory, a processor and a computer program stored in the memory and capable of running on the processor, wherein when executing the computer program, the processor implements the method for information interaction as claimed in claim 4.

10. A non-transitory computer-readable storage medium, storing computer-executable instructions, wherein the computer-executable instructions are configured to execute the method for information interaction as claimed in claim 2.

11. A non-transitory computer-readable storage medium, storing computer-executable instructions, wherein the computer-executable instructions are configured to execute the method for information interaction as claimed in claim 3.

12. A non-transitory computer-readable storage medium, storing computer-executable instructions, wherein the computer-executable instructions are configured to execute the method for information interaction as claimed in claim 4.

13. The method for information interaction according to claim 1, wherein generating vehicle early-warning information according to the at least two pieces of vehicle information, comprises:
   acquiring road test point information, generating the vehicle early-warning information according to the road test point information and the at least two pieces of vehicle information.

* * * * *